United States Patent [19]

Tremaglio et al.

[11] Patent Number: 5,597,349
[45] Date of Patent: Jan. 28, 1997

[54] ROTARY STRIPPER AND SHIELD

[75] Inventors: Anthony Tremaglio, Waterbury; Ronald Brightman, Cheshire, both of Conn.

[73] Assignee: Everlast Products Inc., Watertown, Conn.

[21] Appl. No.: 322,331

[22] Filed: Oct. 13, 1994

[51] Int. Cl.⁶ ................................................. B24B 55/05
[52] U.S. Cl. .................................. 451/451; 451/466
[58] Field of Search .................................. 451/451, 452, 451/454, 455, 465, 466, 469, 453

[56] References Cited

U.S. PATENT DOCUMENTS

| | | |
|---|---|---|
| 1,123,562 | 1/1915 | Lund ........................................ 451/454 |
| 1,160,841 | 11/1915 | Cartwright ............................... 451/452 |
| 1,335,223 | 3/1920 | Dellgren .................................. 451/452 |
| 2,374,988 | 5/1945 | Flohr et al. ............................. 451/452 |
| 2,382,147 | 8/1945 | Hanak ..................................... 451/452 |
| 2,714,905 | 8/1955 | Clayton . | |
| 3,380,094 | 4/1968 | Comstock . | |
| 3,510,989 | 5/1970 | Tolle . | |
| 3,591,989 | 7/1971 | Granlie .................................... 451/451 |
| 3,731,338 | 5/1973 | Walsh et al. . | |
| 3,958,294 | 5/1976 | Thompson . | |
| 3,969,856 | 7/1976 | Zerrer ...................................... 451/451 |
| 4,060,940 | 12/1977 | DeWitt .................................... 451/451 |
| 4,251,171 | 2/1981 | Brett . | |
| 4,317,282 | 3/1982 | Pace . | |
| 4,319,433 | 3/1982 | Nolen et al. ............................ 451/451 |
| 4,365,448 | 12/1982 | Wilson .................................... 451/466 |
| 4,905,424 | 3/1990 | Nagashima et al. .................... 451/455 |
| 5,077,942 | 1/1992 | Jacobsson .............................. 451/451 |
| 5,371,977 | 12/1994 | Liner ...................................... 451/451 |
| 5,440,815 | 8/1995 | Jnkster ................................... 451/451 |

Primary Examiner—Timothy V. Eley
Attorney, Agent, or Firm—Sherman and Shalloway

[57] ABSTRACT

A shield for a rotary stripper tool, the shield comprising a hollow, semi-circular housing open along one edge and having a volume to rotatably receive a rotary stripper tool which is freely rotatable therein so that, at any one time during rotation of the stripper tool, substantially one half of the stripper tool is covered by the shield. An elongated handle ember is fixed to the shield and extends substantially perpendicularly to the plane of the shield to engage a power tool on which the rotary stripper tool is mounted. The handle provides a means whereby the shield may be held in a fixed position relative to the rotary stripper tool and the power tool while allowing the user to hold the power tool in both hands for better control.

8 Claims, 5 Drawing Sheets

ROTARY STRIPPER AND SHIELD

FIELD OF THE INVENTION

The present invention relates to a rotary stripper or scraper and a protective debris shield for such devices whereby protection is provided to users of rotary strippers or scrapers from flying debris. The present invention further relates to a shield for such devices which is an integral part of the tool and to shields which are designed to be retrofitted to existing rotary scrapers and strippers which do not have a shield.

BACKGROUND OF THE INVENTION

Safety requirements now require that manufacturers of various devices provide means to protect users of their devices from injury incurred as a result of such use. Toward this end, many manufacturers of tools are now placing shields and other protective devices on their new products or are offering such devices for retrofitting to their older models. One tool which has a great potential to cause injury to its users from flying debris is the rotary scraper or stripper of the type disclosed in U.S. Pat. No. 3,958,294, Thompson. This device comprises a central hub with a shaft for mounting in the chuck of a power drill and a plurality of pivot shafts arranged around the hub around which wire fingers are wound. The fingers project beyond the periphery of the hub to strike a work surface at a lagging angle and thereby remove material such as paint, varnish, or the like, from the work surface.

As a result of the high rotary speed imparted by the power drill to the tool, debris from the work surface is thrown upwards and may cause injury to the user. Accordingly, it has been desired to provide strippers and other rotary driven tools with protective shields to restrict the trajectory of flying debris. Examples of such shields on rotary strippers and scrapers are found in U.S. Pat. No. 3,380,094, Comstock; No. 3,510,989, Tolle; and No. 3,731,338, Walsh, et al.

These patents disclose scrapers, chippers and abrasive tools which are driven in a rotary manner by an apparatus, such as a power drill, on which the tools are mounted. In each case, the shield is an integral part of the tool which is not readily removable therefrom and which must be separately steadied by the user thereby leaving the user only one hand to steady the power drill and control the action of the torque induced by the drill. For example, the chipper of Comstock comprises a plurality of flexible chains attached to a rotary hub shaft so as to flail against a work surface. The shield comprises a semicylindrical wall with ends in which the hub shaft is journaled. A handle is provided extending upward from the semicylindrical wall to be grasped by one hand while the other hand holds the power drill. Similarly, Tolle discloses a portable abrasive tool comprising a drum on a shaft which is mountable in the chuck of a power drill for rotary operation. A semicylindrical shield is provided along the length of the drum and has a knob extending from the shield for grasping and steadying the tool. Walsh, et al., disclose a mechanical paint scraper in which the scraping face is transverse to the axis of rotation and a handle extends radially to the axis of the driving shaft. This handle is grasped separately from the electric drill used to power the tool.

Thus, in each of the above patents, the rotary tool and its shield are separately handled apart from the power drill which drives the tool. Since the power drill is a high speed rotary device, it sets up a torque which must be countered by an opposite force exerted by the user. In the case of a power drill which is being used to drive a rotary stripper of the Thompson type, it is much easier to control the action of both the drill and the tool if the user can keep both hands on the drill with one hand on the drill handle and the other hand over the body of the drill. The prior art stripper and shield combinations do not permit this. Furthermore, it is desirable to have a shield construction which can be readily adapted to be retrofitted onto existing rotary stripper tools.

SUMMARY OF THE INVENTION

It is an object of the present invention to provide an improved rotary stripper and shield combination for use with a power tool.

It is a further object of this invention to provide an improved rotary stripper and shield combination which is easily manufactured and which is adaptable to any model of rotary stripper.

It is a still further object of this invention to provide a shield for rotary stripper tools which may be manufactured as an integral and non-removable part of the tool and which may be manufactured as a separate item for retrofitting to existing, non-shielded tools.

Further objects and advantages will become evident from the description and drawings herein.

The present invention comprises a shield for rotary strippers and the combination of such a stripper and the shield. The shield comprises a hollow, semi-circular housing open along one edge and having a volume to rotatably receive a rotary stripper tool freely rotatable therein so that at any one time during rotation of the stripper tool, substantially one half of the stripper tool is covered by the shield. An elongated handle member is fixed to the shield and extends substantially perpendicularly to the plane of the shield and parallel to the axis of the stripper to engage a power tool on which the rotary stripper tool is mounted. The handle serves as a means to hold the shield in a fixed position relative to both the rotary stripper tool and the power tool while permitting the user to steady the power tool with both hands.

In the combination, a rotary stripper tool comprises a hub, a plurality of elastically flexible fingers pivotably attached to the hub and extending outwardly therefrom, and an axial shaft extending centrally from the hub whereby the stripper is mountable in a tool receiving chuck on a rotary power tool. Rotation of the hub about its central axis proximate to a work surface causes the outward tips of the fingers to flexibly impinge the work surface at a point substantially removed from the projection of the hub axis onto the work surface. The improvement in this combination comprises a shield mounted on the rotary stripper and enclosing approximately one half of the stripper opposite the work surface, the shield and stripper being freely relatively rotatable. A handle member is attached to the shield and extends substantially parallel to the axial shaft of the stripper whereby, when the stripper is mounted in the chuck of the power tool, the handle engages the power tool housing whereby the user may hold the shield in a fixed position relative to the stripper and the power tool while simultaneously holding the power tool with both hands, thereby maintaining better control over the power tool and the stripper.

DETAILED DESCRIPTION OF THE INVENTION

Figure 1:
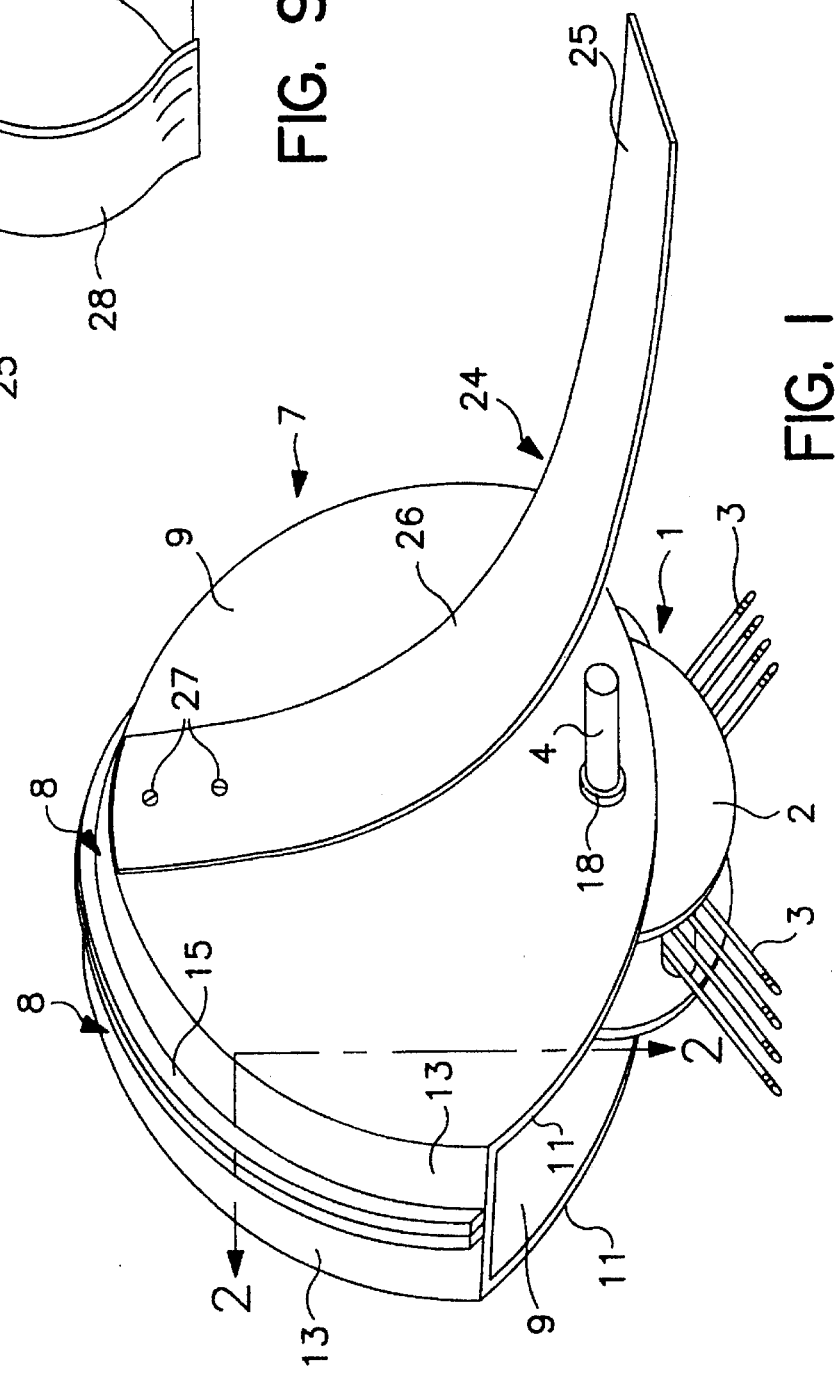
FIG. 1 is an oblique view of the combination shield and rotary stripper of the present invention.
Figure 2:
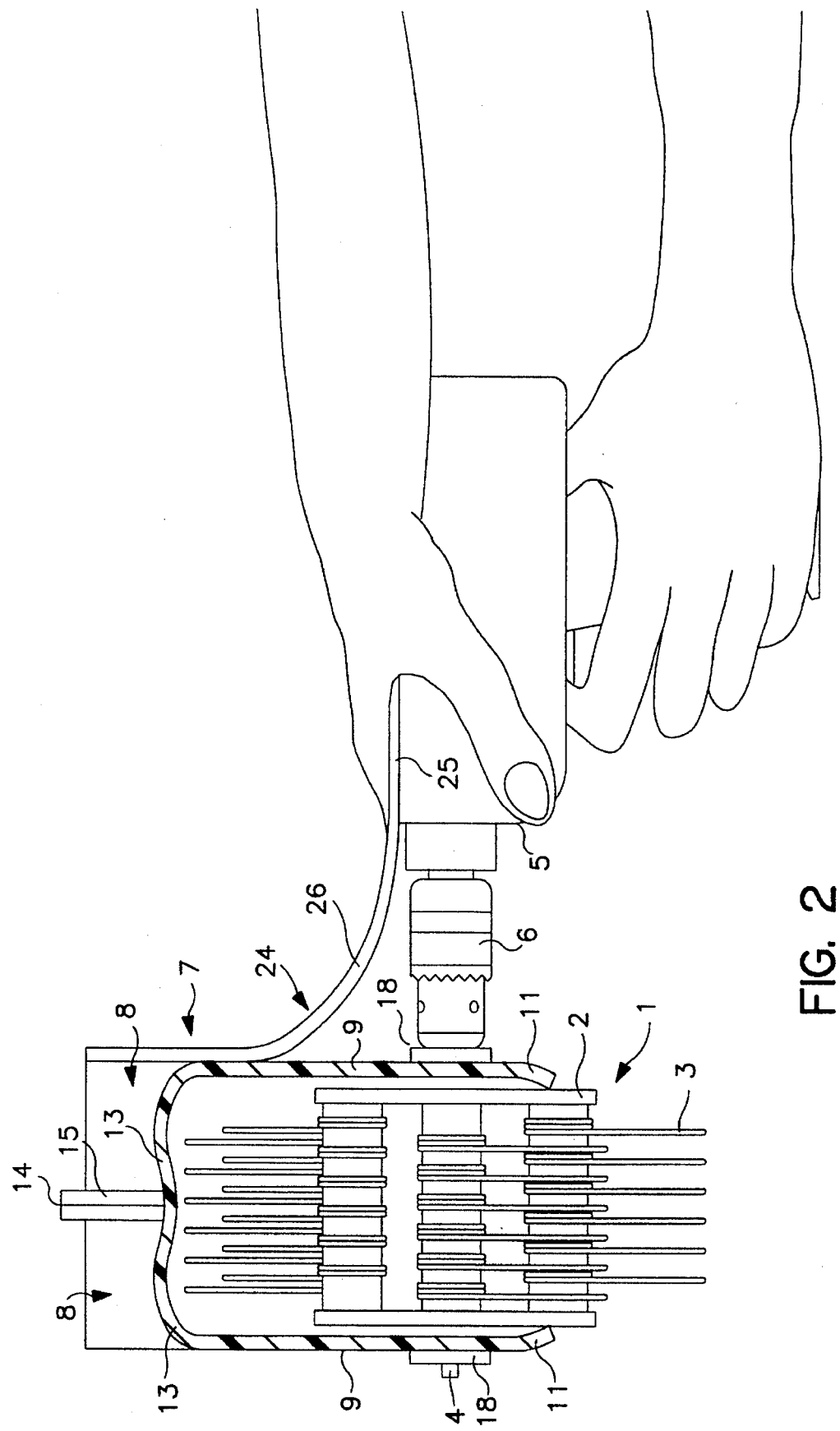
FIG. 2 is an elevation view of the combination shield and rotary stripper of the present invention installed on a power drill with the shield cut-away along line 2—2 of FIG. 1.
Figure 3:
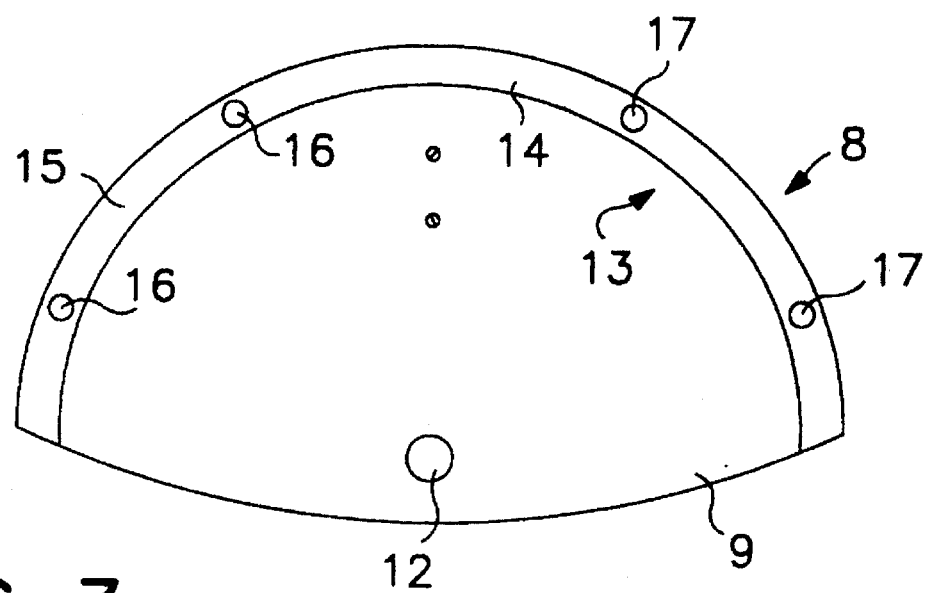
FIG. 3 is an inside planar elevation of a preferred embodiment of a shield section.
Figure 4:
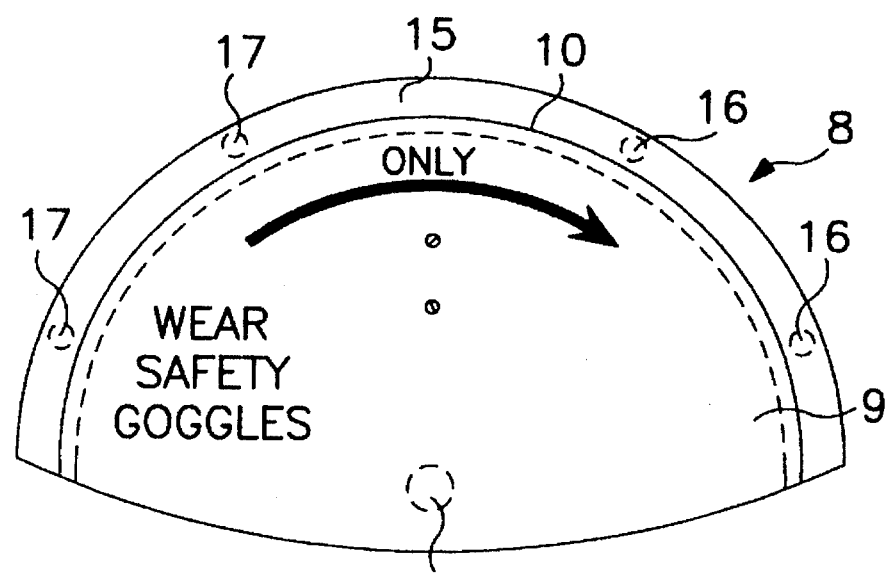
FIG. 4 is an outside planar elevation of a preferred embodiment of a shield section.
Figure 5:
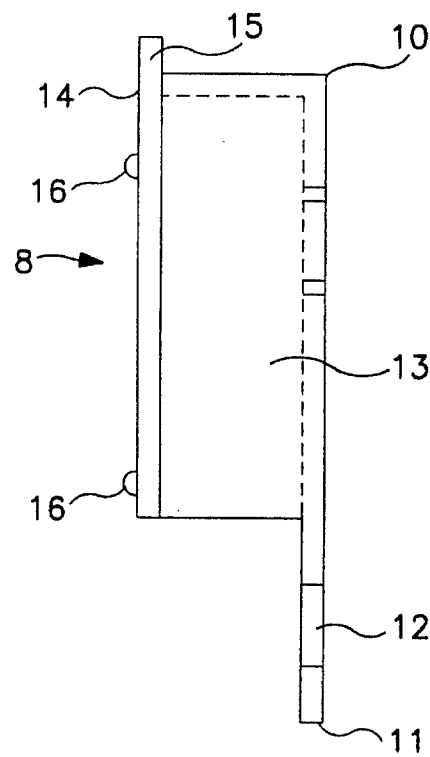
FIG. 5 is an end elevation of a preferred embodiment of a shield section.
Figure 6:
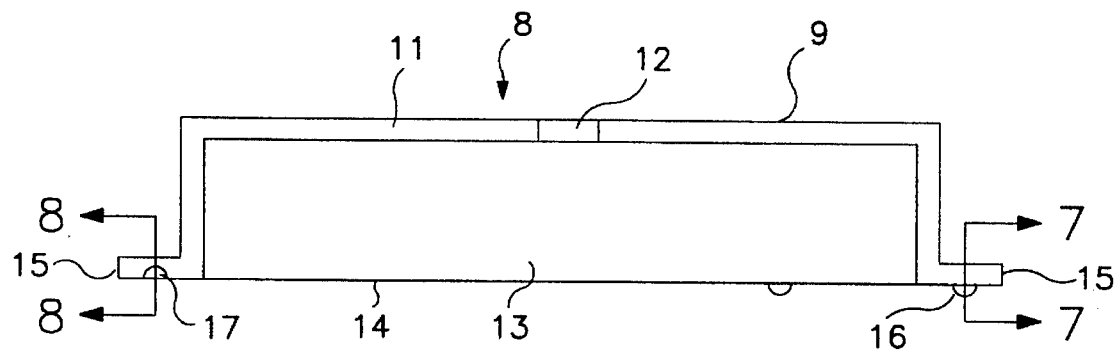
FIG. 6 is a bottom view of a preferred embodiment of a shield section.

FIG. 1 illustrates the combination of rotary stripper 1 and shield 7 of the present invention. Rotary stripper 1 includes hub 2 from which tines 3 extend to contact a work surface when stripper 1 is rotated. To mount stripper 1 in chuck 6 of power tool 5, hub shaft 4 extends from hub 2. FIG. 2 illustrates the combination rotary stripper 1 and shield 7 mounted on power tool 5 and shows the manner in which the present invention allows the user to hold power tool 5 for better control while using rotary stripper tool 1 therewith with shield 7 in place.

In the preferred form of the invention, shield 7 is constructed from two shield halves 8 which are molded from a suitable synthetic polymer. Suitable polymers include, but are not limited to, polystyrene, polyvinyl chloride, or polycarbonates, such as Lexan®. Alternatively, shieled 7 may be fabricated from sheet metal or molded in one piece from a suitable polymer and mounted on stripper 1 in a manner which will be described later. FIGS. 3–6 illustrate the shield half 8, two of which are combined, as shown in FIGS. 1 and 2, to form shield 7.

Figure 12:
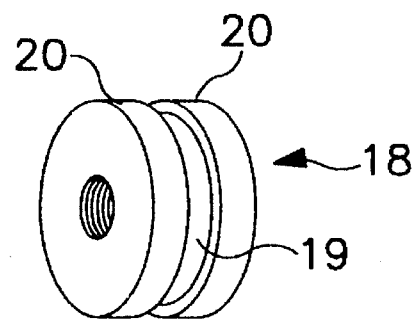
FIG. 12 is an oblique view of a bushing for use with the shield of this invention.

Each shield half 8 comprises a planar side wall 9 having an upper semi-circular edge 10 and a lower arcuate edge 11, the arc of which extends below the radial center of side wall 9 a sufficient distance to permit an aperture 12 to be provided at the radial center of wall 9. In an alternative design, lower edge 11 may be straight forming a chord across the circle of side wall 9 below aperture 12. Aperture 12 provides a passage through wall 9 for hub shaft 4 of stripper 1. A bushing 18 is placed in aperture 12 to provide a low friction, wear resistant surface for hub shaft 4. One form of such a bushing is shown in FIG. 12 and preferably includes an annular slot 19 with flanges 20 on either side. Aperture 12 is preferably sized to the outer diameter of bushing 18 within slot 19 and shield section 8 is preferably molded around bushing 18 with flanges 20 engaging the inner and outer faces of side wall 9 around aperture 12.

Figures 7, 8:
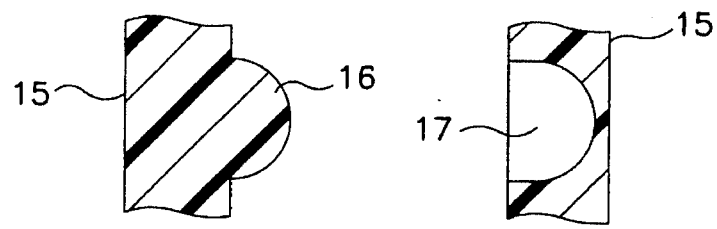
FIG. 7 is a detail cross section taken along line 7—7 of FIG. 6.
FIG. 8 is a detail cross section taken along line 8—8 of FIG. 6.

Extending perpendicularly from upper semi-circular edge 10 is arcuate skirt 13, along the edge 14 of which two shield halves 8 are joined to form the complete shield 7. To assist in aligning two shield halves 8 and bonding them together, each shield half 8 is provided with a mating flange 15 extending perpendicularly to skirt 13 along skirt edge 14. Preferably mating flange 15 is provided with cooperating means to position two shield halves 8 in registration to each other for bonding to assemble a complete shield 7. One such means comprises alternating protrusions 16 and recesses 17, as shown in FIGS. 7 and 8 respectively, which, when two halves 8 are placed together, cooperate to align the halves as well as provide locations where the halves may be bonded together by automatic or manual means. Bonding may be by any appropriate means including, but not limited to, adhesives, welding, ie. heat or RF welding, mechanical fasteners, and the like, and may occur along the entire arc of adjacent mating flanges 15. As shown in FIGS. 3–6, each shield half 8 is preferably provided with protrusions 16 and two recesses 17 equally spaced along flange 15. By providing protrusions 16 and recesses 17 and in either an alternating arrangement or with two adjacent protrusions 16 along one half of flange 15 and two adjacent recesses 17 along the other half of flange 15, only one model of shield half 8 need be produced since reversing one shield half 8 to engage another shield half 8 will result in a mating pair of halves which are mirror images of each other. Alternatively, left and right shield halves 8 may be produced with other cooperating registration means, such as a ridge along one flange 15 which fits into a receiveing channels along the other flange 15.

In the preferred embodiment, shield halves 8 are molded from a substantially rigid material, such as a polycarbonate, with bushing 18 in place and stripper 1 is provided with hub shaft 4 which extends completely through both sides of hub 2 so that there is a hub shaft end extending from both sides of stripper 1. One end of hub shaft 4 is longer than the other to fit in chuck 6 of power tool 5. Shield halves 8 are assembled around stripper 1 with the ends of hub shaft 4 protruding through bushings 18 as shown in FIG. 2 and are bonded together at least at the cooperating registration means along flanges 15. In this manner, stripper 1 and shield 7 are provided as a finished unit and shield 7 is not removable from stripper 1 without destroying shield 7. This reduces the likelihood that the protective nature of shield 7 will be compromised by non-use.

In an alternative embodiment, shield 7 may be produced separately as a retrofit item for versions of rotary strippers which do not have protective shields. In this embodiment, shield halves 8 may be provided as described above and made from a material which allows sufficient flexibility to permit an already assembled shield 7 to be fit over hub shaft 4 of stripper 1 by sliding one end of hub shaft 4 through one aperture 12 then flexing the opposite side of shield 7 sufficiently to permit the other end of hub shaft 4 to be inserted through the other aperture 12.

Figure 10:
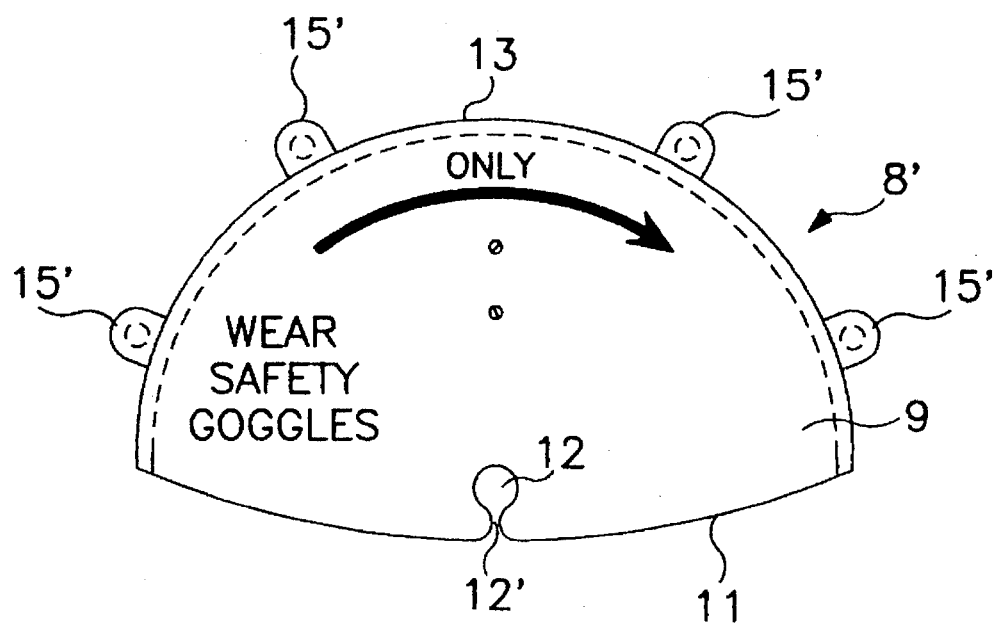
FIG. 10 is an end elevation of an alternative embodiment of the shield section.

An alternative embodiment of the shield half for such a retrofit shield which may be made from a more rigid material is shown in FIG. 10 wherein shield half 8' is provided with an aperture 12 having an open keyway 12' to permit shield 7 to be clipped over bushings 18 placed on hub shaft 4 of stripper 1. The keyway 12' spreads to permit annular slot 19 of bushings 18 to pass through keyway 12' into aperture 12. FIG. 10 also depicts an alternative embodiment of the mating flange 15 which comprises individual tabs 15' extending perpendicularly from arcuate skirt 13 with the cooperating registration means in the form of protrusions 16 and recesses 17 therein.

Figure 11:
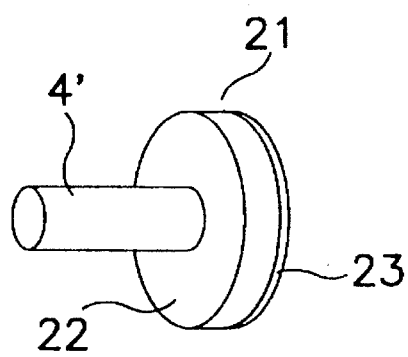
FIG. 11 is an oblique view of an add on stub shaft for use with the alternative shield embodiment of FIG. 10.

The manner in which shield 7 is mounted on stripper 1 requires that there be an end of hub shaft 4 extending beyond hub 2 on both sides of stripper 1. It is normal in such devices to have a sufficient length of shaft 4 extending from one side of hub 2 to fit in and be clamped by chuck 6 of power tool 5. However, not all strippers 1 have a length of shaft 4 extending from the opposite side of hub 2 on which to fit shield 7. This is particularly a problem in those instances where the shield of the present invention will be provided as a retrofit item for existing strippers 1. In such instances, a retrofit shield will include an add-on stub shaft 21 may be provided. One example of stub shaft 21 is shown in FIG. 11 and comprises the shaft portion 4' which is fixed to a mounting plate 22, on the face of which is an adhesive layer 23. Preferably, the adhesive layer is an epoxy or methacrylate adhesive which will provide a permanent bond with the face of hub 2 opposite hub shaft 4. In use, stub-shaft 21 is mounted to the face of hub 2 which is opposite from hub shaft 4. Care must be taken to ensure that stub shaft 21 is centered on the face of hub 2 and for this purpose a template may be provided.

Figure 9:
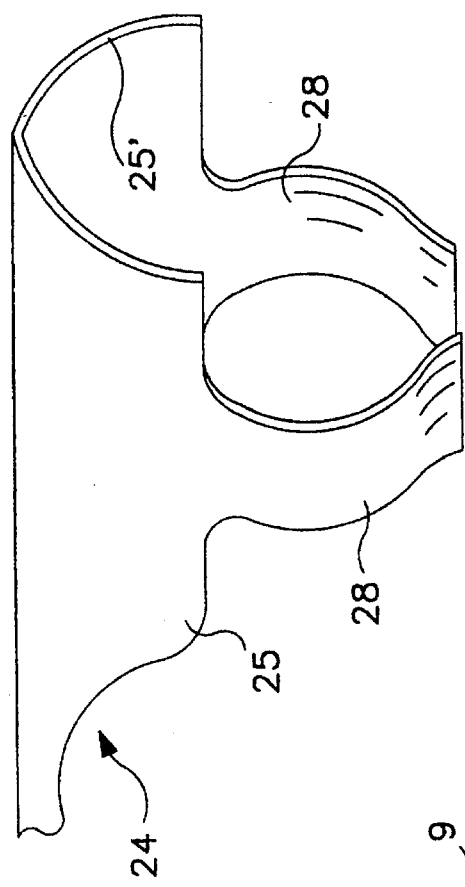
FIG. 9 is an oblique view of an alternative enbodiment of the shield handle.

Inasmuch as shield 7 and stripper 1 are freely rotatable relative to each other, means must be provided to ensure that shield 7 may be fixed in a position relative to stripper 1, power tool 5 and a work surface and to releasably maintain shield 7 in that position so that it does not rotate about hub shaft 4 into the work area but can be easily repositioned when desired. Furthermore, such a means must allow the user to keep both hands on the power tool 5 which is used to drive stripper 1 thereby providing maximum control over the tool while it is in use. The present invention fulfills these requirements by providing an elongated handle 24 fixed to shield 7 so as to be extendable therefrom substantially parallel to the axis of hub shaft 4 as shown in FIGS. 1 and 2. One end of handle 24 is permanently fixed to shield 7 at locations 27 by means of adhesive, welding or mechanical fasteners. Handle 24 may be formed with a fixed shape to extend downward and outward relative to shield 7 as shown in FIG. 1. However, handle 24 is preferably formed from a material which permits the neck portion 26 to be resiliently flexible along its length yet resist twisting about its longitudinal axis thereby permitting handle 24 to adjust to fit power tools of different relative sizes. The free end 25 of handle 24 engages the housing of power tool 5 to fit under the user's hand as shown in FIG. 2. In its base form as shown in FIG. 1, free end 25 is simply the end of the piece of stock from which handle 24 is formed. Alternatively, free end 25 may be molded with a transverse curve 25', as shown in FIG. 9, to fit over and more closely engage the housing of power tool 5. With either embodiment, the user both steadies power tool 5 and holds shield 7 in position with one hand while the other hand holds the grip of power tool 5 thus providing better control over power tool 5. Handle 24 may be held in place on power tool 5 by other means such as adhesive tape, hose clamps, spring clips, or the like. FIG. 9 also illustrates an alternative embodiment of handle 24 in which a spring clip 28 is molded in as an integral part of free end 25. Necessarily, in this embodiment, handle 24 would be formed from a material having the requisite shape retention and memory of a spring clip.

The manner of use of the shield and the combination shield and stripper of this invention is shown in FIG. 2. Shield 7 is attached to stripper 1 either permanently during manufacture or as a retrofit as previously described. Hub shaft 4 of stripper 1 is inserted into chuck 6 of power tool 5 and chuck 6 is tightened in the manner common to such devices. Handle 24 is positioned so that end 25 engages the body of power tool 5 rearward of chuck 6 in a position to be held by the user so that only that portion of stripper 1 which is to strike a work surface is exposed. In use, power tool 5 is held in both hands in a normal manner and is under complete control while, simultaneously, shield 7 is held in a fixed position relative to power tool 5 and the work surface. Should the position of use change, the user need simply relax his grip over end 25, rotate shield relative to power tool 5 and regrip end 25 against power tool 5. Where the alternative form of handle 24 with integral clip 28 is used, end 25 is pressed against power tool 5 to spread the arms of clip 28 around power tool 5 allowing transverse curve 25' to fit over and engage the curve of the housing of power tool 5. The clamping force of clip 28 grips the body of power tool 5 to hold handle 24 and, thereby, shield 7 in place.

Although the present invention has been described with respect to specific details of certain embodiments thereof, it is not intended that such details act as limitations upon the scope of the invention. The invention is limited only as here claimed.

What is claimed is:

1. A shield for a rotary stripper tool, said shield comprising first and second parallel, spaced, planar, semi-circular walls and a third arcuate wall joining said first and second walls along semi-circular edges thereof, thereby forming a hollow, semi-circular housing open along one edge and having a volume to rotatably receive a rotary stripper tool freely rotatable therein so that, at any one time during rotation of said stripper tool, substantially one half of said stripper tool is covered by said shield, means to attach said shield to said rotary stripper tool whereby said stripper tool is freely rotatable about its axis therein, and an elongated handle member fixed to one of said first and second planar walls and extending substantially perpendicular to the plane of said wall to engage a power tool on which said rotary stripper tool is mounted, whereby said shield is held in a fixed position relative to said rotary stripper tool and said power tool;

said shield further comprising first and second shield sections, said first and second shield sections being identical and each comprising a semi-circular wall and an arcuate skirt extending perpendicularly to the plane of said wall along the semi-circular edge thereof whereby said first and second shield sections are joined along cooperating edges of said skirts to form said hollow semi-circular housing, and whereby said joined arcuate skirts form said third arcuate wall of said shield;

wherein said first and second shield sections have axially aligned apertures capable of receiving a hub shaft of said stripper, said apertures having low friction bushings therein to receive said hub shaft whereby said stripper is freely rotatable within said shield and wherein said handle comprises an elongated, resiliently flexible neck portion and a molded head portion at one end of said neck portion, whereby the other end of said neck portion is fixed to one of said first and second walls of said shield and said handle extends substantially perpendicularly to the plane of said wall whereby said molded head portion engages said power tool.

2. The shield of claim 1 further comprising means to removably fix said handle to said power tool.

3. The shield of claim 2 wherein said means to removably fix said handle to said power tool comprises a resilient clip which engages the body of said power tool.

4. The shield of claim 3 wherein said head portion is transversely curved to accomodate the shape of said power tool and a user's hand.

5. The shield of claim 3 wherein said resilient clip is an integrally molded part of said molded head portion of said handle.

6. The shield of claim 1 further comprising mating means along said cooperating edges of said arcuate skirts whereby said shield sections are joined.

7. The shield of claim 6 wherein said mating means comprises an arcuate flange extending perpendicularly from said skirt and cooperating registration means whereby said shield sections are maintained in position for joining along said flange.

8. The shield of claim 6 wherein said mating means comprises individual tabs extending perpendicularly from said skirt at equidistant locations and cooperating registration means whereby said shield sections are maintained in position for joining at said tabs.

* * * * *